(12) United States Patent
Kim et al.

(10) Patent No.: US 11,236,708 B1
(45) Date of Patent: Feb. 1, 2022

(54) FUEL ODOR CONTROL SYSTEM FOR VEHICLE

(71) Applicants: HYUNDAI MOTOR COMPANY, Seoul (KR); KIA MOTORS CORPORATION, Seoul (KR)

(72) Inventors: Chang Han Kim, Gwangju (KR); Gil Eon Kang, Suwon-si (KR); Jun Sik Lim, Bucheon-si (KR); Seung Hoon Choi, Seoul (KR)

(73) Assignees: Hyundai Motor Company, Seoul (KR); Kia Motors Corporation, Seoul (KR)

( * ) Notice: Subject to any disclaimer, the term of this patent is extended or adjusted under 35 U.S.C. 154(b) by 0 days.

(21) Appl. No.: 17/158,341

(22) Filed: Jan. 26, 2021

(30) Foreign Application Priority Data

Aug. 28, 2020 (KR) .................. 10-2020-0109119

(51) Int. Cl.
*F02M 25/08* (2006.01)
*B01D 53/04* (2006.01)
*F02D 41/00* (2006.01)
*B01D 46/42* (2006.01)
*B01D 46/44* (2006.01)
*F02M 35/10* (2006.01)

(52) U.S. Cl.
CPC ..... *F02M 25/0836* (2013.01); *B01D 46/4272* (2013.01); *B01D 46/44* (2013.01); *B01D 53/0415* (2013.01); *B01D 53/0446* (2013.01); *B01D 53/0454* (2013.01); *F02D 41/0032* (2013.01); *F02M 25/0872* (2013.01); *F02M 35/10222* (2013.01); *B01D 2253/102* (2013.01); *B01D 2257/702* (2013.01); *B01D 2259/4566* (2013.01); *B01D 2279/60* (2013.01); *F02D 2200/0602* (2013.01); *F02D 2200/501* (2013.01); *F02D 2200/70* (2013.01)

(58) Field of Classification Search
CPC .......... F02M 25/0836; F02M 25/0872; F02M 35/10222; B01D 53/0454; B01D 53/0446; B01D 53/0415; B01D 46/44; B01D 46/4272; B01D 2259/4566; B01D 2279/60; B01D 2257/702; B01D 2253/102; F02D 2200/501; F02D 2200/0602; F02D 2200/70
See application file for complete search history.

(56) References Cited

U.S. PATENT DOCUMENTS 4,887,578 A * 12/1989 Woodcock ....... B60K 15/03504
123/519
5,277,168 A * 1/1994 Kondo ............. B60K 15/03504
123/198 D (Continued)

*Primary Examiner* — George C Jin
(74) *Attorney, Agent, or Firm* — Morgan, Lewis & Bockius LLP

(57) ABSTRACT

A fuel system for a vehicle includes a fuel evaporation gas treatment system configured to control fuel evaporation gas generated inside a fuel tank. The fuel evaporation gas treatment system includes: a gas collection chamber configured to store the fuel evaporation gas discharged from the canister through an atmosphere line connected to the canister; and an outlet of the gas collection chamber is connected to a purge line through a gas intake line so that the fuel evaporation gas stored in the gas collection chamber flows into an engine through the gas intake line and the purge line.

17 Claims, 9 Drawing Sheets

(56) References Cited

U.S. PATENT DOCUMENTS

| | | | | |
|---|---|---|---|---|
| 5,363,828 | A | * | 11/1994 | Yamashita ......... F02M 25/0809 123/198 D |
| 6,367,458 | B1 | * | 4/2002 | Furusho ............. F02M 25/0809 123/198 D |
| 2008/0283127 | A1 | * | 11/2008 | Wang ............... B60K 15/03519 137/313 |
| 2020/0263638 | A1 | * | 8/2020 | Honda ............... F02M 25/0854 |

* cited by examiner

FIG. 1 – PRIOR ART -
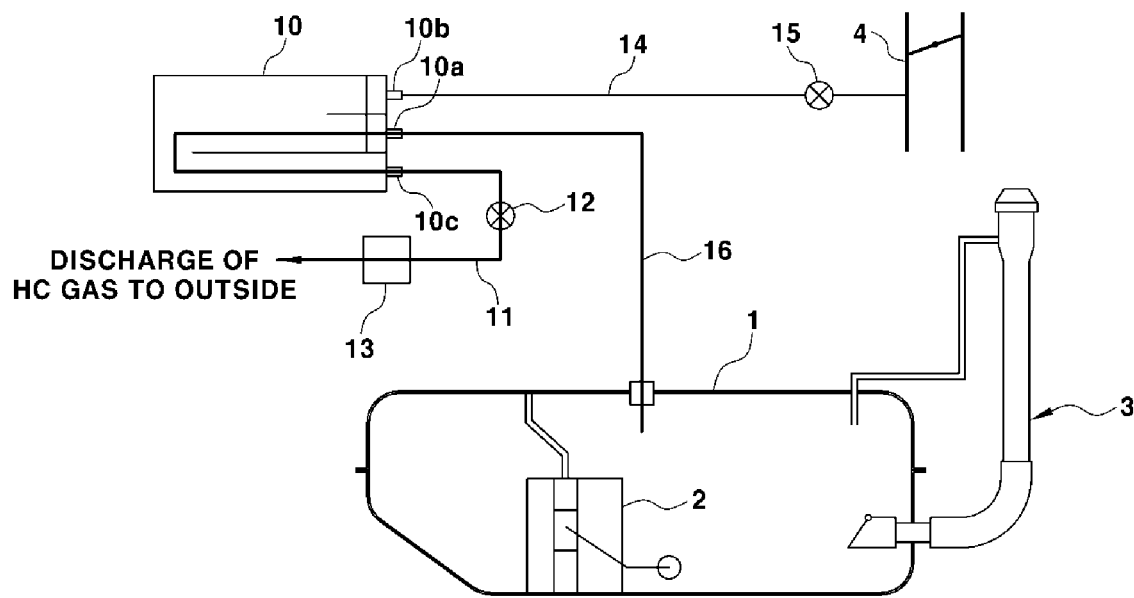
FIG. 2
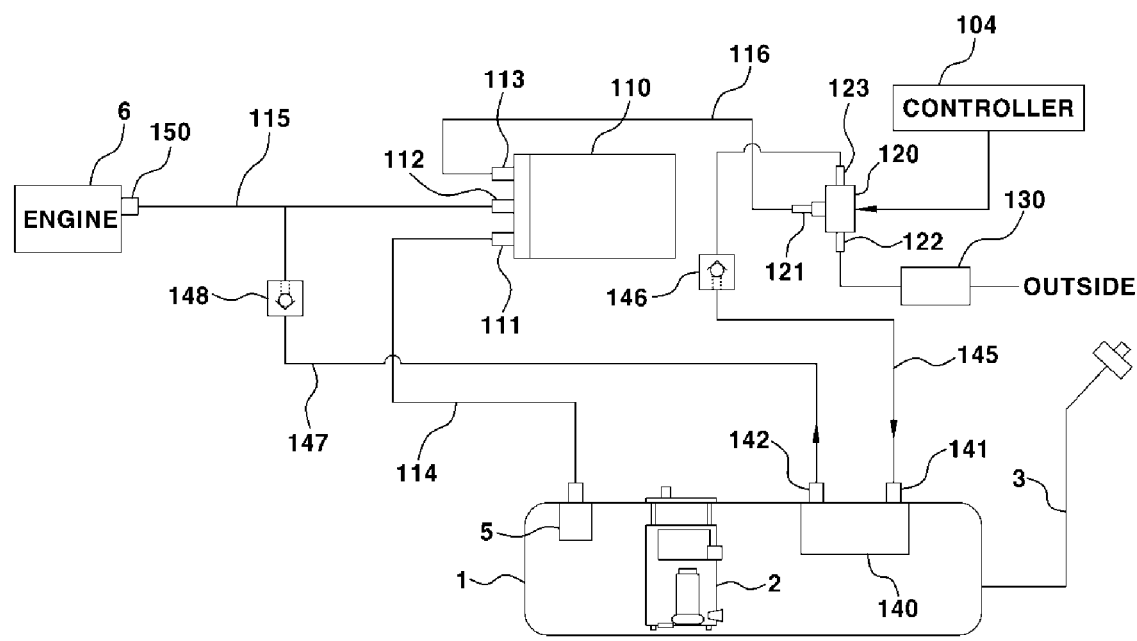

FUEL ODOR CONTROL SYSTEM FOR VEHICLE

CROSS-REFERENCE TO RELATED APPLICATION

This application claims the benefit of priority to Korean Patent Application No. 10-2020-0109119 filed on Aug. 28, 2020 in the Korean Intellectual Property Office, the entire contents of which are incorporated herein by reference.

TECHNICAL FIELD

The present disclosure relates to a fuel system for a vehicle. More particularly, the present disclosure relates to a fuel system for a vehicle which may eliminate the smell of fuel occurring due to discharge of fuel evaporation gas from a canister of a vehicle.

BACKGROUND

In general, a fuel system for a vehicle includes: a fuel tank configured to store fuel; a fuel pump module configured to discharge the fuel stored in the fuel tank so as to supply the fuel to an engine; a fuel filter configured to remove foreign substances from the fuel supplied to the engine; and fuel lines, such as a fuel supply line and a fuel return line, configured to pass the fuel therein.

The fuel system further includes a fuel evaporation gas treatment system configured to treat and remove fuel evaporation gas (HC gas) generated inside the fuel tank. FIG. 1 is a schematic diagram illustrating the configuration of a fuel evaporation gas treatment system. In FIG. 1, reference numeral 1 indicates a fuel tank, reference numeral 2 indicates a fuel pump module installed in the fuel tank 1, and reference numeral 3 indicates a filler neck assembly configured to inject fuel into the fuel tank 1.

As shown in this figure, the fuel evaporation gas treatment system includes a canister 10 configured to adsorb and collect fuel evaporation gas generated inside the fuel tank 1, an air filter 13 configured to remove foreign substances from air inhaled into the canister 10, a canister close valve (hereinafter referred to as a CCV) configured to open and close a pipe line 11 between the canister 10 and the air filter 13, and a purge control solenoid valve (hereinafter referred to as a PCSV) 15 configured to open and close a pipe line (a purge line) 14 between the canister 10 and an engine intake system 4 or to adjust the opening degree of the pipe line 14.

In detail, gas occurring due to evaporation of the fuel, i.e., fuel evaporation gas including fuel components, such as hydrocarbons (HC), is generated inside the fuel tank 1. Therefore, in order to prevent air pollution due to the fuel evaporation gas generated inside the fuel tank 1, the canister 10 configured to collect and store the fuel evaporation gas from the fuel tank 1 is installed in the vehicle.

The canister 10 is formed by filing the inside of a case with an adsorbent substance which may adsorb the fuel evaporation gas transferred from the fuel tank 1, and activated carbon is widely used as the adsorbent substance. Activated carbon functions to adsorb hydrocarbons (HO), which are the fuel components, in the fuel evaporation gas inhaled into the case of the canister 10.

In the canister 10, the fuel evaporation gas is adsorbed onto the adsorbent substance in the state in which the engine is stopped. Further, in the canister 10, when the engine runs, the fuel evaporation gas adsorbed onto the adsorbent substance is desorbed from the adsorbent substance by the pressure of air inhaled from the outside (atmosphere), and the desorbed gas together with air may be supplied to the engine intake system.

An operation of inhaling the fuel evaporation gas collected in the canister 10 into the engine is referred to as a purge operation, and the gas inhaled from the canister 10 to the engine is referred to as purge gas. Such purge gas may be gas in which fuel components, such as hydrocarbons (HO) or the like, desorbed from the adsorbent substance of the canister 10, are mixed with air.

The PCSV 15 for controlling the purge operation is installed on the purge line 14 which is a pipe line for connecting the canister 10 to the engine intake system 4. The PCSV 15 is opened when the purge operation is performed during driving of the engine, and the fuel evaporation gas generated inside the fuel tank 1 is collected in the canister 10, is transmitted to the engine intake system 4 through the opened PCSV 15 during driving of the engine, and is then combusted in the engine.

The PCSV 15 is a valve controlled by a controller which is not shown, for example, an engine control unit (ECU). The controller opens or closes the PCSV 15 (turns on and off the purge operation) depending on a vehicle driving state or controls the opening degree of the PCSV 15 (i.e., the flow rate of the fuel evaporation gas passing through the PCSV 15) so as to control the fuel evaporation gas.

In general, the canister 10 includes the case filled with the adsorbent substance (for example, activated carbon). A loading port 10a configured to be connected to the fuel tank 1 so as to inhale the fuel evaporation gas thereinto, a purge port 10b configured to be connected to the engine intake system 4 so as to transfer the fuel evaporation gas to the engine, and an atmosphere port 10c configured to be connected to the air filter (canister filter) 13 so as to inhale air in the atmosphere thereinto are formed on the case.

The loading port 10a of the canister 10 is connected to the fuel tank 1 through a loading line 16, and the purge port 10b of the canister 10 is connected to the engine intake system 4 through the purge line 14. An atmosphere line (vent line) 11 connected to the air filter 13 is connected to the atmosphere port 10c of the canister 10.

A diaphragm (not shown) configured to separate a space, in which the atmosphere port 10c is located, from a space, in which the purge port 10b and the loading port 10a are located, is formed in the inner space of the case. Therefore, while the fuel evaporation gas introduced from the fuel tank 1 through the loading port 10a passes through the inner space of the case, separated by the diaphragm, hydrocarbons, i.e., the fuel components, are adsorbed onto the adsorbent substance.

Further, when the PCSV 15 is opened by the controller during driving of the engine and thus suction pressure, i.e., the negative pressure of the engine, is applied to the inner space of the canister 10 through the purge port 10b from the engine intake system 4, air is inhaled through the air filter 13 and the atmosphere port 10c, and gas desorbed from the adsorbent substance by air is discharged through the purge port 10b and is inhaled into the engine intake system 4.

In order to perform the purge operation in which the fuel components, such as hydrocarbons or the like, are desorbed from the adsorbent substance in the canister 10 and is then inhaled into the engine intake system 4, the negative pressure of the engine must be applied to the canister 10 through the purge line 14 and the purge port 10b.

However, even when the vehicle is provided with the fuel evaporation gas treatment system, the smell of fuel may permeate the vehicle. That is, the fuel evaporation gas (HC gas) is discharged to the outside when the vehicle is in the stopped state, and thus a driver or passengers may recognize the smell of fuel. Such smell of fuel may mainly occur under high-temperature and high-altitude conditions, and the driver or the passengers may recognize the smell of fuel when the vehicle is in the stopped state.

Transfer of engine heat, exhaust heat, and external heat, such as geothermal heat, is increased and thus the inner temperature of the fuel tank is raised in the high-temperature condition in which the outdoor temperature is high, and vapor pressure is lowered in the high-altitude condition. Therefore, fuel evaporation gas (HC) generation is increased in the fuel tank, and when the fuel evaporation gas generation is increased and thus exceeds the collection capacity of the canister 10, the fuel evaporation gas may be discharged to the outside. Consequently, when the vehicle is in the stopped state, the driver or the passengers may detect the smell of the fuel evaporation gas discharged to the outside (the smell of fuel).

Recently, in order to improve fuel efficiency of vehicles, it is a recent trend to reduce the number of purge operations of the engine, and in a continuously variable valve lift (OWL) engine or in a HEV or PHEV engine, it is necessary to reduce the number of purge operations due to reduction of an engine negative pressure region. Further, in a vehicle having a turbocharger mounted therein, the negative pressure of an engine intake system, such as an intake manifold, is relatively low and thus it is difficult to perform an operation of purging a canister. In such a low-purge engine, there is a high possibility that fuel evaporation gas generation will exceed the collection capacity of the canister. Therefore, a technology for solving the generation of the smell of fuel is required.

The above information disclosed in this Background section is only for enhancement of understanding of the background of the disclosure and therefore it may contain information that does not form the prior art that is already known in this country to a person of ordinary skill in the art.

SUMMARY OF THE DISCLOSURE

The present disclosure has been made in an effort to solve the above-described problems associated with the prior art, and it is an object of the present disclosure to provide a fuel system for a vehicle which may effectively eliminate the smell of fuel occurring due to discharge of fuel evaporation gas from a canister of a vehicle into the atmosphere.

In one aspect, the present disclosure provides a fuel system for a vehicle, including a fuel evaporation gas treatment system configured to treat and control fuel evaporation gas generated inside a fuel tank, wherein the fuel evaporation gas treatment system includes: a canister configured to allow the fuel evaporation gas introduced thereinto from the fuel tank through a loading line to be adsorbed onto an adsorbent substance so as to be collected in the canister, and to allow the fuel evaporation gas adsorbed onto the adsorbent substance to flow into an engine through a purge line configured to connect the canister to the engine; a purge control solenoid valve disposed in a fuel evaporation gas intake path between the canister and the engine; and a gas collection chamber configured to store the fuel evaporation gas discharged from the canister through an atmosphere line connected to the canister, wherein an outlet of the gas collection chamber is connected to the purge line through a gas intake line so that the fuel evaporation gas stored in the gas collection chamber may flow into the engine through the gas intake line and the purge line.

A three-way valve may be installed on the atmosphere line configured to connect the canister to an air filter, and a gas discharge line configured to branch off from the atmosphere line through the three-way valve may be connected to an inlet of the gas collection chamber.

The gas intake line may connect the outlet of the gas collection chamber to the purge line between the canister and the purge control solenoid valve.

A first check valve configured to enable the fuel evaporation gas having passed the three-way valve to flow in a direction towards the gas collection chamber and to block flow of the fuel evaporation gas in an opposite direction may be installed on the gas discharge line, and a second check valve configured to enable the fuel evaporation gas discharged from the gas collection chamber to flow in a direction towards the purge line and the engine and to block flow of the fuel evaporation gas in an opposite direction may be installed on the gas intake line.

The three-way valve may include a first port connected to an atmosphere port of the canister through the atmosphere line, a second port connected to the air filter through the atmosphere line, and a third port connected to the gas discharge line, and the three-way valve may be configured to selectively open one of an inner flow path between the first port and the second port and an inner flow path between the first port and the third port.

The fuel system may further include a detector configured to detect environmental information of a place, in which a vehicle is located, and vehicle state information, and a controller configured to control an opening and closing operation of the three-way valve based on the environmental information and the vehicle state information detected by the detector.

Upon determining based on the environmental information detected by the detector that a current environment corresponds to high-temperature and high-altitude conditions satisfying predetermined conditions and upon determining based on the vehicle state information detected by the detector that the vehicle is in a stopped state, the controller may control the operation of the three-way valve to block an inner flow path thereof towards the air filter and to open an inner flow path thereof towards the gas collection chamber so that the fuel evaporation gas discharged from the canister flows to the gas collection chamber alone.

Upon determining based on the environmental information detected by the detector that the current environment does not correspond to the high-temperature and high-altitude conditions, the controller may control the operation of the three-way valve to block the inner flow path thereof towards the gas collection chamber and to open the inner flow path thereof towards the air filter so that the fuel evaporation gas discharged from the canister flows to the air filter.

The detector may include an outdoor temperature sensor configured to detect an outdoor temperature and a vehicle speed sensor configured to determine whether or not the vehicle is in the stopped state, and the predetermined conditions may be set to be either a condition in which the outdoor temperature detected by the outdoor temperature sensor is higher than or equal to a predetermined temperature or a condition of sharp temperature rise in which a slope of a rise of the outdoor temperature detected by the outdoor temperature sensor is greater than or equal to a predetermined value.

The detector may include a fuel pressure sensor configured to detect an inner temperature of the fuel tank and a vehicle speed sensor configured to determine whether or not the vehicle is in the stopped state, the controller may determine an inner temperature of the fuel tank corresponding to the inner pressure of the fuel tank detected by the fuel pressure sensor based on the inner pressure of the fuel tank using set information, and the predetermined conditions may be set to be either a condition in which the determined inner temperature of the fuel tank is higher than or equal to a predetermined temperature or a condition of sharp temperature rise in which a slope of a rise of the determined inner temperature of the fuel tank is greater than or equal to a predetermined value.

The gas intake line may connect the outlet of the gas collection tank to the purge line between the canister and the purge control solenoid valve, a check valve configured to enable the fuel evaporation gas discharged from the gas collection chamber to flow in a direction towards the purge line and the engine and to block flow of the fuel evaporation gas in an opposite direction may be installed on the gas intake line, and upon determining based on the detected vehicle state information that the vehicle is in a driving state, the controller may control a flow rate of the fuel evaporation gas passing through the purge control solenoid valve depending on vehicle driving state information so as to selectively open the check valve.

The vehicle driving state information may include a vehicle load, and in a high-load state in which the vehicle load is higher than or equal to a designated level, the controller may decrease the flow rate of the fuel evaporation gas passing through the purge control solenoid valve to be less than or equal to a predetermined value so that only the fuel evaporation gas collected in the canister is inhaled into the engine and purged in a closed state of the check valve.

The vehicle driving state information may include the vehicle load, and in a low-load state in which the vehicle load is lower than a designated level, the controller may increase the flow rate of the fuel evaporation gas passing through the purge control solenoid valve to exceed a predetermined value so that both the fuel evaporation gas collected in the canister and the fuel evaporation gas collected in the gas collection chamber are inhaled into the engine and purged in an opened state of the check valve.

The gas collection chamber may be installed in the fuel tank.

The gas collection chamber may be installed such that at least a portion thereof is inserted into the fuel tank.

Amounting hole may be formed in the fuel tank, a flange part protruding from an entire circumference of an upper end of the gas collection chamber may be formed at the upper end of the gas collection chamber, and in a state in which a chamber part of the gas collection chamber provided under the flange part is inserted into the fuel tank through the mounting hole, the gas collection chamber may be fixed to the fuel tank by a mounting cap.

A cylindrical fastening part protruding in an outward direction of the fuel tank may be formed along an edge of the mounting hole of the fuel tank, and in a state in which the flange part of the gas collection chamber is placed on the upper surface of the fastening part, the mounting cap may be fastened to the fastening part by threaded engagement so as to surround the flange part of the gas collection chamber from above.

Other aspects and embodiments of the disclosure are discussed infra.

The above and other features of the disclosure are discussed infra.

BRIEF DESCRIPTION OF THE DRAWINGS

The above and other features of the present disclosure will now be described in detail with reference to certain exemplary embodiments thereof illustrated in the accompanying drawings which are given hereinbelow by way of illustration only, and thus are not limitative of the present disclosure, and wherein:

FIG. 1 is a schematic diagram illustrating a conventional fuel evaporation gas treatment system;

FIG. 2 is a schematic diagram illustrating a fuel evaporation gas treatment system for vehicles according to one embodiment of the present disclosure;

Figure 3:
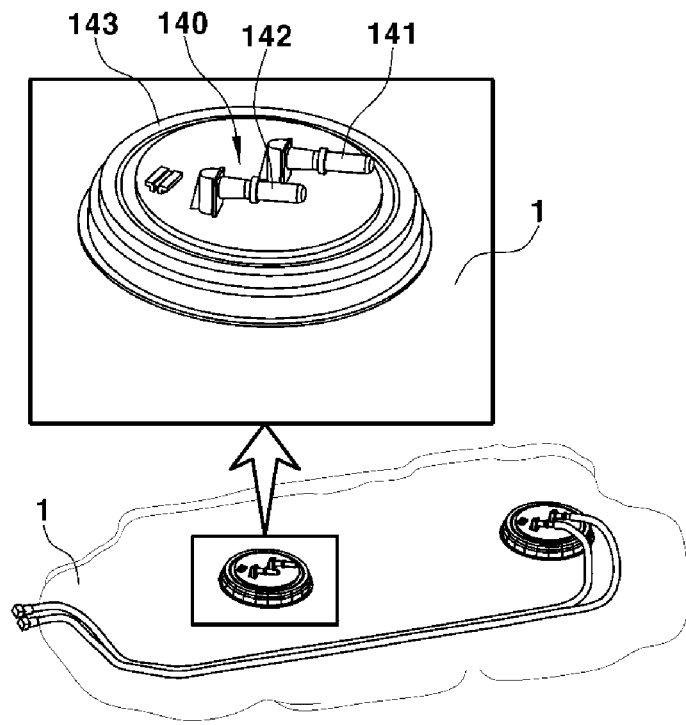
FIG. 3 is a perspective view illustrating a gas collection chamber installed in a fuel tank in the fuel evaporation gas treatment system according to one embodiment of the present disclosure.

It should be understood that the appended drawings are not necessarily to scale, presenting a somewhat simplified representation of various features illustrative of the basic principles of the disclosure. The specific design features of the present disclosure as disclosed herein, including, for example, specific dimensions, orientations, locations, and shapes will be determined in part by the particular intended application and use environment.

In the figures, reference numbers refer to the same or equivalent parts of the present disclosure throughout the several figures of the drawing.

DETAILED DESCRIPTION

Hereinafter, reference will be made in detail to various embodiments of the present disclosure, examples of which are illustrated in the accompanying drawings and described below. While the disclosure will be described in conjunction with exemplary embodiments, it will be understood that the present description is not intended to limit the disclosure to the exemplary embodiments. On the contrary, the disclosure is intended to cover not only the exemplary embodiments, but also various alternatives, modifications, equivalents and other embodiments, which may be within the spirit and scope of the disclosure as defined by the appended claims.

In the following description of the embodiments, it will be understood that, when a part is said to "include" an element, the part may further include other elements, and does not exclude the presence of other elements unless stated otherwise.

FIG. 2 is a schematic diagram illustrating a fuel system for vehicles according to one embodiment of the present disclosure. As shown in this figure, the fuel system for vehicles according to one embodiment of the present disclosure includes a fuel tank 1 configured to store fuel, a fuel pump module 2 configured to discharge the fuel stored in the fuel tank 1 to an engine 6, a fuel filter configured to remove foreign substances from the fuel supplied to the engine 6, and fuel lines, such as a fuel supply line and a fuel return line, configured to pass the fuel therein. The fuel filter and the fuel lines are not shown in FIG. 2.

In addition, the fuel system for vehicles according to one embodiment of the present disclosure further includes a fuel evaporation gas treatment system configured to treat and remove fuel evaporation gas (HC gas) generated inside the fuel tank 1. The fuel evaporation gas treatment system has a configuration in which the fuel evaporation gas generated inside the fuel tank 1 is collected in a canister 110 and is then transferred to the engine 6 through a purge control solenoid valve (hereinafter referred to as PCSV) 150 so as to be combusted, i.e., a configuration for purging the fuel evaporation gas.

As shown in this figure, the fuel evaporation gas treatment system includes the canister 110 configured to adsorb and collect the fuel evaporation gas generated inside the fuel tank 1, an air filter 130 configured to remove foreign substances from air inhaled into the canister 110, and the PCSV 150 configured to open and close a purge line 115 between the canister 110 and the engine 6 or to adjust the opening degree of the purge line 115.

The canister 110 is formed by filling the inside of a case with an adsorbent substance which may adsorb the fuel evaporation gas transferred from the fuel tank 1, and the adsorbent substance may be activated carbon. Activated carbon functions to adsorb hydrocarbons (HC), which are fuel components, in the fuel evaporation gas introduced into the case of the canister 110.

In the canister 110, the fuel evaporation gas is adsorbed onto the adsorbent substance in the state in which the engine 6 is stopped. Further, in the canister 110, when the engine 6 runs, the fuel evaporation gas adsorbed onto the adsorbent substance is desorbed from the adsorbent substance by the pressure of air inhaled from the outside (atmosphere), and the desorbed gas together with air may be supplied to an engine intake system.

An operation of inhaling the fuel evaporation gas collected in the canister 110 into the engine 6 is referred to as a purge operation, and the gas inhaled from the canister 110 to the engine 6 is referred to as purge gas. Such purge gas may be gas in which the fuel component such as hydrocarbons (HO) or the like, desorbed from the adsorbent substance of the canister 110, are mixed with air.

In the canister 110, a purge port 112 configured to be connected to the engine intake system so as to transfer the fuel evaporation gas to the engine 6, a loading port 111 configured to be connected to the fuel tank 1 so as to inhale the fuel evaporation gas generated inside the fuel tank 1 thereinto, and an atmosphere port 113 configured to be connected to the air filter (canister filter) 130 so as to inhale air in the atmosphere thereinto are formed on the case filled with the adsorbent substance (for example, activated carbon).

The loading port 111 of the canister 110 is connected to the fuel tank 1 through a loading line 114, and the purge port 112 of the canister 110 is connected to the engine 6 through the purge line 115. Further, an atmosphere line 116 connected to the external atmosphere is connected to the atmosphere port 113 of the canister 110, and the air filter 130 is installed on the atmosphere line 116. Reference numeral 5 in FIG. 2 indicates a valve which is installed in the fuel tank 1 and to which the loading line 114 is connected, and may be a general rollover valve 5.

The fuel evaporation gas treatment system of the fuel system according to one embodiment of the present disclosure further includes a gas collection chamber 140 configured to separately collect and store the fuel evaporation gas (HO gas) discharged through the atmosphere port 113 of the canister 110.

Figure 4:
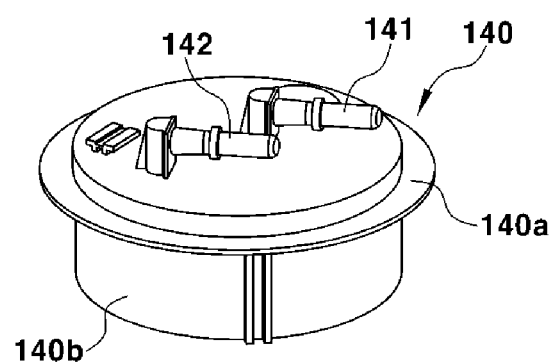
FIG. 4 is a perspective view illustrating the gas collection chamber in the fuel evaporation gas treatment system according to one embodiment of the present disclosure.
Figure 5:
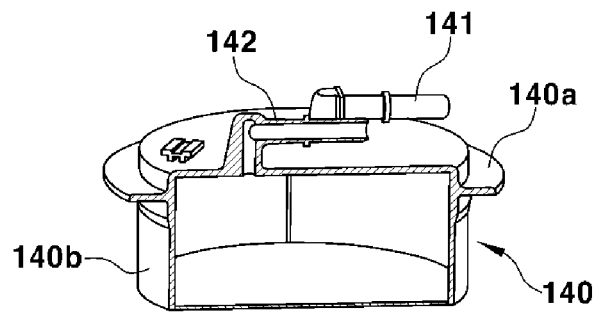
FIG. 5 is a cross-sectional perspective view of the gas collection chamber in the fuel evaporation gas treatment system according to one embodiment of the present disclosure.
Figure 6:
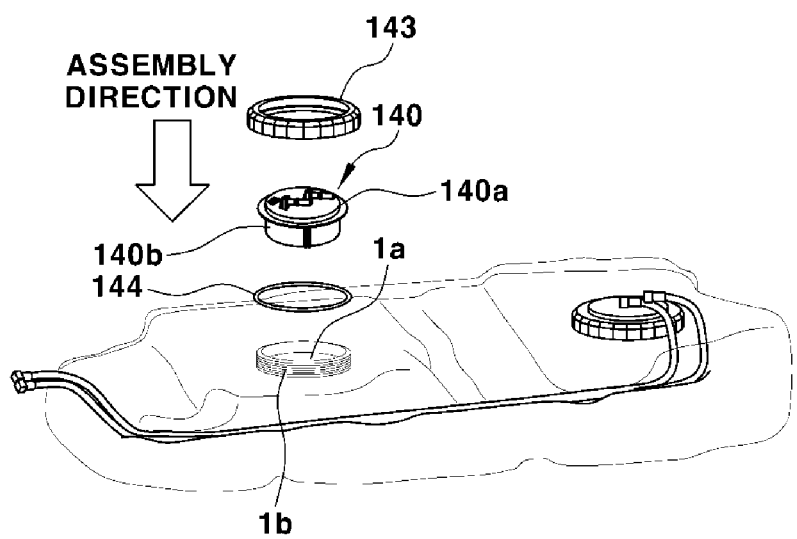
FIG. 6 is an exploded perspective view illustrating the assembled structure of the gas collection chamber in a fuel system according to one embodiment of the present disclosure.

FIG. 3 is a perspective view illustrating the gas collection chamber 140 installed in the fuel tank 1 in the fuel system according to one embodiment of the present disclosure, and FIG. 4 is a perspective view illustrating the gas collection chamber 140 in the fuel system according to one embodiment of the present disclosure. FIG. 5 is a cross-sectional perspective view of the gas collection chamber 140, and FIG. 6 is an exploded perspective view illustrating the assembled structure of the gas collection chamber 140 and the fuel tank 1. FIG. 6 illustrates the state of the gas collection chamber 140 prior to assembly, i.e., the state in which the gas collection chamber 140 is separated from the fuel tank 1.

As shown in these figures, the gas collection chamber 140 may be installed in the fuel tank 1, such that at least a portion of the gas collection chamber 140 is inserted into the fuel tank 1. For this purpose, a mounting hole 1a is formed in the upper surface of the fuel tank 1, and the gas collection chamber 140 is inserted into the mounting hole 1a through the mounting hole 1a so as to be located in the fuel tank 1.

In the structure for assembling the gas collection chamber 140 with the fuel tank 1, a cylindrical fastening part 1b protruding in the outward direction of the fuel tank 1 is formed along the edge of the mounting hole 1a of the fuel tank 1, and a screw thread is formed on the outer circumferential surface of the fastening part 1b. A flange part 140a protruding in the radial direction from the entire circumference of the upper end of the gas collection chamber 140 is formed at the upper end of the gas collection chamber 140.

Therefore, as shown in FIG. 6, a chamber part 140b of the gas collection chamber 140 provided under the flange part 140a may be inserted into the fuel tank 1 through the mounting hole 1a formed inside the fastening part 1b. Here, the flange part 140a of the gas collection chamber 140 is caught by the upper end of the fastening part 1b. In addition, a mounting cap 143, which is fastened to the outer circumferential surface of the fastening part 1b of the mounting hole 1a of the fuel tank 1 by threaded engagement, is provided.

When the gas collection chamber 140 is assembled, the chamber part 140b provided under the flange part 140a is inserted into the fuel tank 1 through the mounting hole 1a, and after insertion, the flange part 140a of the gas collection chamber 140 is placed on the upper end of the fastening part 1b of the fuel tank 1. In this state, the mounting cap 143 is fastened to the outer circumferential surface of the fastening part 1b by threaded engagement so as to surround the flange part 140a of the gas collection chamber 140 from above.

After the mounting cap 143 is fastened to the outer circumferential surface of the fastening part 1b by threaded engagement, the mounting tap 143 is placed on the upper surface of the flange part 140a of the gas collection chamber 140, and consequently, the gas collection chamber 140 is fixed to the mounting hole 1a and the fastening part 1b of the fuel tank 1 by the mounting cap 143 (with reference to FIG. 3). When the mounting cap 143 is fastened to the outer circumferential surface of the fastening part 1b by threaded engagement, a seal ring 144 configured to maintain airtightness may be interposed between the lower surface of the flange part 140a of the gas collection chamber 140 and the upper end of the fastening part 1b of the fuel tank 1 and compressed.

The gas collection chamber 140 may be provided in a cylindrical container shape having a designated volume, as shown in FIGS. 4 and 5. Further, there is a vertical height difference between the upper surface of the gas collection chamber 140 and the upper surface of the flange part 140a, and the mounting cap 143 is coupled to the fastening part 1b of the fuel tank 1 by threaded engagement so that the inner surface of the mounting cap 143 is placed on the upper surface of the flange part 140a.

According to the above assembly structure, after the mounting cap 143 is rotated in an unfastening direction so as to be separated from the fastening part 1b of the fuel tank 1, the gas collection chamber 140 may be separated from the fuel tank 1. That is, through the above assembly structure, the gas collection chamber 140 may be easily separated from the fuel tank 1, and after separation of the gas collection chamber 140 from the fuel tank 1, A/S of the gas collection chamber 140, such as repair or replacement of the gas collection chamber 140, may be performed as needed.

An inlet 141, through which the fuel evaporation gas (HO gas) enters the gas collection chamber 140, and an outlet 142, through which the fuel evaporation gas is discharged from the gas collection chamber 140, are provided on the gas collection chamber 140. The inlet 141 and the outlet 142 may protrude from the upper surface of the gas collection chamber 140, as exemplarily shown in the figures. Therefore, the inlet 141 and the outlet 142 are exposed to the outside of the fuel tank 1 in the state in which the gas collection chamber 140 is located within the fuel tank 1. Referring to FIG. 3, it may be confirmed that the gas collection chamber 140 is located within the fuel tank 1, and in this case, the inlet 141 and the outlet 142 of the gas collection chamber 140 are exposed to the outside of the fuel tank 1.

An electronic three-way valve 120 is installed between the atmosphere port 113 and the air filter 130 on the atmosphere line 116 connected to the atmosphere port 113 of the canister 110, and a gas discharge line 145 is connected to the electronic three-way valve 120. A part of the atmosphere line 116 connected to the atmosphere port 113 of the canister 110 is connected to a first port 121 of the three-way valve 120, and the other part of the atmosphere line 116 connected to the air filter 130 is connected to a second port 122 of the three-way valve 120. Further, the gas discharge line 145 connected to the gas collection chamber 140 is connected to a third port 123 of the three-way valve 120.

The gas discharge line 145 is a kind of branch line which branches off from the atmosphere line 116 through the three-way valve 120, and connects the three-way valve 120 to the inlet 141 of the gas collection chamber 140. A first check valve 146 for preventing backflow is installed on the gas discharge line 145, and the first check valve 146 enables the fuel evaporation gas having passed through the three-way valve 120 to flow only to the inlet 141 of the gas collection chamber 140 and blocks flow of the fuel evaporation gas in the opposite direction so as to prevent the fuel evaporation gas from flowing from the gas collection chamber 140 to the three-way valve 120.

Further, a gas intake line 147 is connected to the purge line 115, which connects the purge port 112 of the canister 110 and the PCSV 150 in the fuel evaporation gas treatment system, and the gas intake line 147 is connected to the outlet 142 of the gas collection chamber 140. That is, the gas intake line 147 connects the outlet 142 of the gas collection chamber 140 to the purge line 115, and a second check valve 148 for preventing backflow is installed on the gas intake line 147.

The second check valve 148 enables the fuel evaporation gas discharged from the gas collection chamber 140 to flow only to the purge line 115 and the engine 6 through the gas intake line 147 and blocks flow of the fuel evaporation gas in the opposite direction when the purge operation is performed.

Further, the second check valve 148 enables the fuel evaporation gas collected in the gas collection chamber 140 to be inhaled into the engine 6 only when the flow rate of the fuel evaporation gas passing through the PCSV 150 is equal to or greater than a designated flow rate when the purge operation is performed during driving of the engine 6. That is, the second check valve 148 is controlled to be opened or closed in connection with the purge flow rate of the PCSV 150 (i.e., the flow rate of the fuel evaporation gas passing through the PCSV 150), and the second check valve 148 is opened when the purge flow rate of the PCSV 150 is equal to or greater than the designated flow rate.

In one embodiment of the present disclosure, the three-way valve 120 installed on the atmosphere line 116 is an electronic valve, which may be controlled to be opened and closed by a controller 104, and a solenoid-type three-way valve 120, in which a valve body is operated by a solenoid and thus selectively opens and closes inner flow paths, may be used. The three-way valve 120 is used as a substitute for the conventional canister close valve (CCV).

The three-way valve 120 includes, as described above, the first port 121 connected to the atmosphere port 113 of the canister 110, the second port 122 connected to the air filter 130, and the third port 123 connected to the inlet 141 of the gas collection chamber 140. Further, the opening and closing operation of the three-way valve 120 is controlled in response to a control signal output from the controller 104, and in more detail, the operation of the solenoid is controlled in response to the control signal and the valve body selectively opens and closes the inner flow paths depending on the operating state of the solenoid.

For example, the inner flow path between the first port 121 and the third port 123 may be opened so that the first port 121 and the third port 123 may communicate with each other and thus the fuel evaporation gas may flow along the inner flow path between the first port 121 and the third port 123 (when the vehicle is in the stopped state under high-temperature and high land conditions). Further, the inner flow path between the first port 121 and the second port 122 may be opened so that the first port 121 and the second port 122 may communicate with each other and thus the fuel evaporation gas may flow along the inner flow path between the first port 121 and the second port 122 (when the pressure in the fuel tank 1 is released).

In one embodiment of the present disclosure, the purge line 115, the loading line 114, the atmosphere line 116, the gas discharge line 145 and the gas intake line 147 are pipe lines along which the fuel evaporation gas or air flows, and may be formed of tubes, hoses or pipes.

Further, in the fuel system according to the present disclosure, the fuel evaporation gas is transferred to the gas collection chamber 140 separately provided in the fuel tank 1 so as to be stored in the gas collection chamber 140 before the amount of the fuel evaporation gas collected in the canister 110 reaches a predetermined capacity limit when the vehicle is in the stopped state under the high-temperature and high land conditions, thereby being capable of solving a problem in which the fuel evaporation gas is discharged to the atmosphere due to the capacity limit of the canister 110 for collecting the fuel evaporation gas and thus eliminating the smell of fuel.

Figure 7:
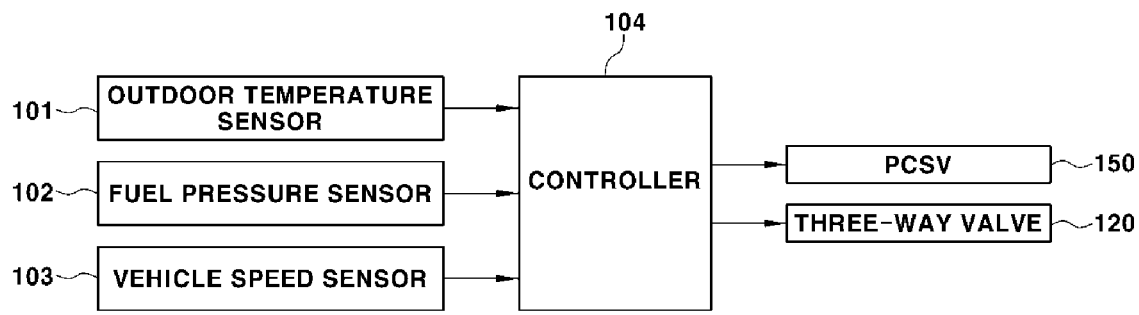
FIG. 7 is a block diagram illustrating essential elements of the fuel system according to one embodiment of the present disclosure.

For this purpose, the fuel system according to one embodiment of the present disclosure further includes a detector including sensors 101 to 103 and the controller 104, as shown in FIG. 7. FIG. 7 is a block diagram illustrating essential elements of the fuel system according to one embodiment of the present disclosure. In one embodiment of the present disclosure, the controller 104 collects environmental information of a place, at which the vehicle is located, and vehicle state information through the detector, and determines whether or not a current environment corresponds to the high-temperature and high-altitude conditions and whether or not the vehicle is in the stopped state based on the collected environmental information and vehicle state information.

In one embodiment of the present disclosure, the detector is configured to detect the environmental information of the place, at which the vehicle is located, and the vehicle state information, and may include an outdoor temperature sensor 101 configured to detect an outdoor temperature, and a vehicle speed sensor 103 configured to detect a vehicle speed. Here, the detector may further include a fuel pressure sensor 102 configured to detect the inner pressure of the fuel tank 1. Alternatively, the outdoor temperature sensor 101 may be replaced with the fuel pressure sensor 102. That is, the detector may include one of the outdoor temperature sensor 101 and the fuel pressure sensor 102.

Figure 8:
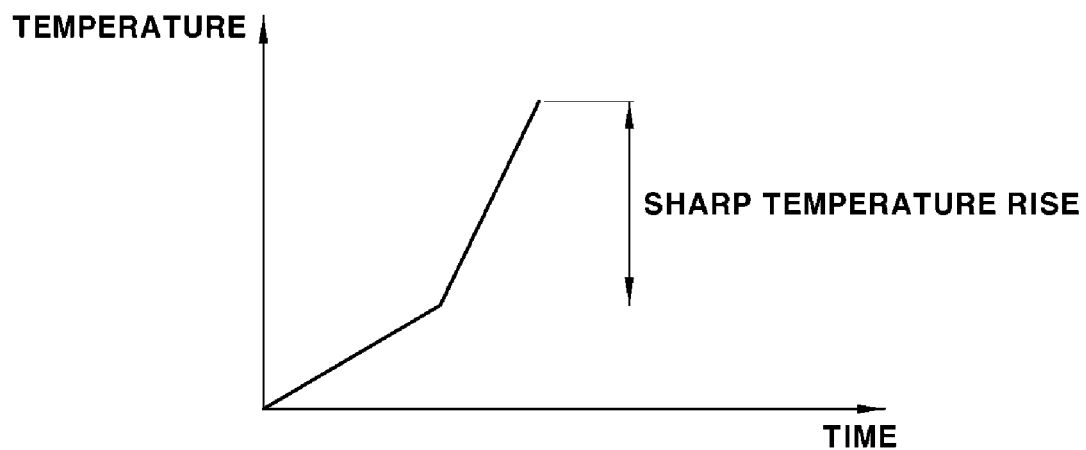
FIG. 8 is a graph representing one example of sharp temperature rise satisfying high-temperature and high-altitude conditions according to the present disclosure.

The controller 104 may determine based on the outdoor temperature detected by the outdoor temperature sensor 101 whether or not the current environment corresponds to the high-temperature and high-altitude conditions. Here, when the outdoor temperature is higher than or equal to a predetermined temperature, the controller 104 may determine that the current environment corresponds to the high-temperature and high-altitude conditions. Alternatively, when the outdoor temperature is raised sharply, i.e., when the slope of an outdoor temperature change (the slope of an outdoor temperature rise) over time is greater than or equal to a predetermined value, as exemplarily shown in FIG. 8, the controller 104 may determine that the current environment corresponds to the high-temperature and high-altitude conditions.

Otherwise, the controller 104 may estimate the inner temperature of the fuel tank 1 from the inner pressure of the fuel tank 1 detected by the fuel pressure sensor 102 using set information in which relationships between pressure and temperature are defined in advance. Further, the controller 104 may determine based on the estimated inner temperature of the fuel tank 1 whether or not the current environment corresponds to the high-temperature and high-altitude conditions. Here, when the inner temperature of the fuel tank 1 is higher than or equal to a predetermined temperature, the controller 104 may determine that the current environment corresponds to the high-temperature and high-altitude conditions. Alternatively, when the inner temperature of the fuel tank 1 is raised sharply, i.e., when the slope of an inner temperature change of the fuel tank 1 (the slope of an inner temperature rise of the fuel tank 1) over time is greater than or equal to a predetermined value, the controller 104 may determine that the current environment corresponds to the high-temperature and high-altitude conditions.

Here, the set information may be data including a map, a table, a mathematical formula, a diagram, etc., in which relationships between pressure and temperature are defined, and the set information may be calculated from data acquired through a preceding testing and evaluation process, input to the controller 104 and stored in advance in the controller 104. In general, when the inner temperature of the fuel tank 1 is raised due to a high temperature, the inner pressure of the fuel tank 1 is raised due to the excessive amount of evaporation in the high-altitude condition. Using the above relationships between the inner pressure of the fuel tank 1 and the inner temperature of the fuel tank 1, the temperature information of the fuel tank 1 may be acquired from the pressure information of the fuel pressure sensor 102.

Further, the controller 104 determines from vehicle speed information detected by the vehicle speed sensor 103 whether or not the vehicle is currently in the stopped state. Here, the controller 104 may be a general engine control unit (ECU) or engine management system (EMS).

The fuel system for vehicles and the fuel evaporation gas treatment system thereof according to one embodiment of the present disclosure have been described, and a process of controlling and operating the same will be described below.

Figure 9:
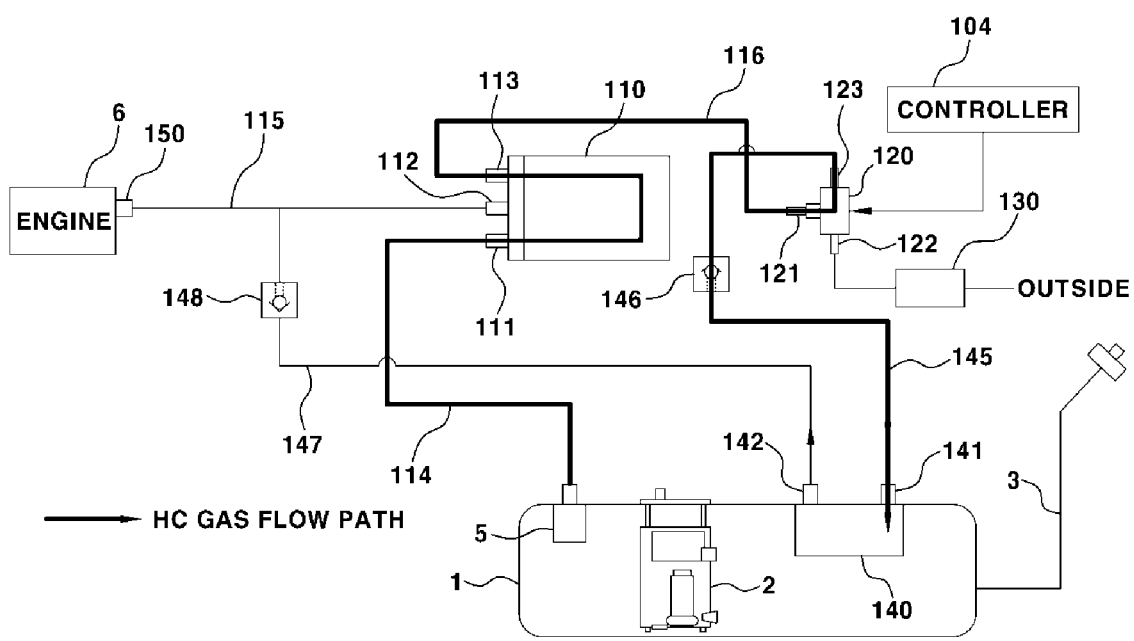
FIG. 9 is a schematic diagram illustrating a state in which fuel evaporation gas is loaded when the vehicle is in the stopped state under the high-temperature and high-altitude conditions, in the fuel system according to one embodiment of the present disclosure.

FIG. 9 is a schematic diagram illustrating the state in which the fuel evaporation gas is loaded when the vehicle is in the stopped state under the high-temperature and high-altitude conditions, in the fuel system according to one embodiment the present disclosure, and in this case, the arrows indicate flow paths of the fuel evaporation gas (HO gas). Here, "loading" means that the fuel evaporation gas generated inside the fuel tank 1 is adsorbed onto the adsorbent substance (for example, activated carbon) in the canister 110 so as to be collected in the canister 110.

As shown in this figure, upon determining that the current environment corresponds to the high-temperature and high-altitude conditions and the current state of the vehicle corresponds to the stopped state, the controller 104 outputs a control signal for opening the flow path from the canister 110 to the gas collection chamber 140. Thereby, the operation of the valve body of the three-way valve 120 is controlled by the control signal from the controller 104, and thus the inner flow path between the first port 121 and the third port 123 is opened.

In this state, the fuel evaporation gas generated inside the fuel tank 1 is discharged to the loading line 114 through the rollover valve 5, and the fuel evaporation gas moving along the loading line 114 is introduced into the loading port 111 of the canister 110. Here, a portion of the fuel evaporation gas is adsorbed onto the adsorbent substance in the canister 110, and the remaining portion of the fuel evaporation gas is discharged to the atmosphere line 116 through the atmosphere port 113. The fuel evaporation gas discharged to the atmosphere line 116 is moved to the gas discharge line 145 by the three-way valve 120, and is then moved to the inside of the gas collection chamber 140 so as to be stored therein.

As such, upon determining that the current environment corresponds to the high-temperature and high-altitude conditions and the current state of the vehicle corresponds to the vehicle stopped state, the fuel evaporation gas having passed through the canister 110 is not discharged to the atmosphere through the air filter 130, but is moved to the inside of the gas collection chamber 140 so as to be stored therein. When the vehicle is in the stopped state under the high-temperature and high-altitude conditions, no fuel evaporation gas is discharged to the atmosphere and thus the driver or passengers in the vehicle cannot detect the smell of fuel.

Figure 10:
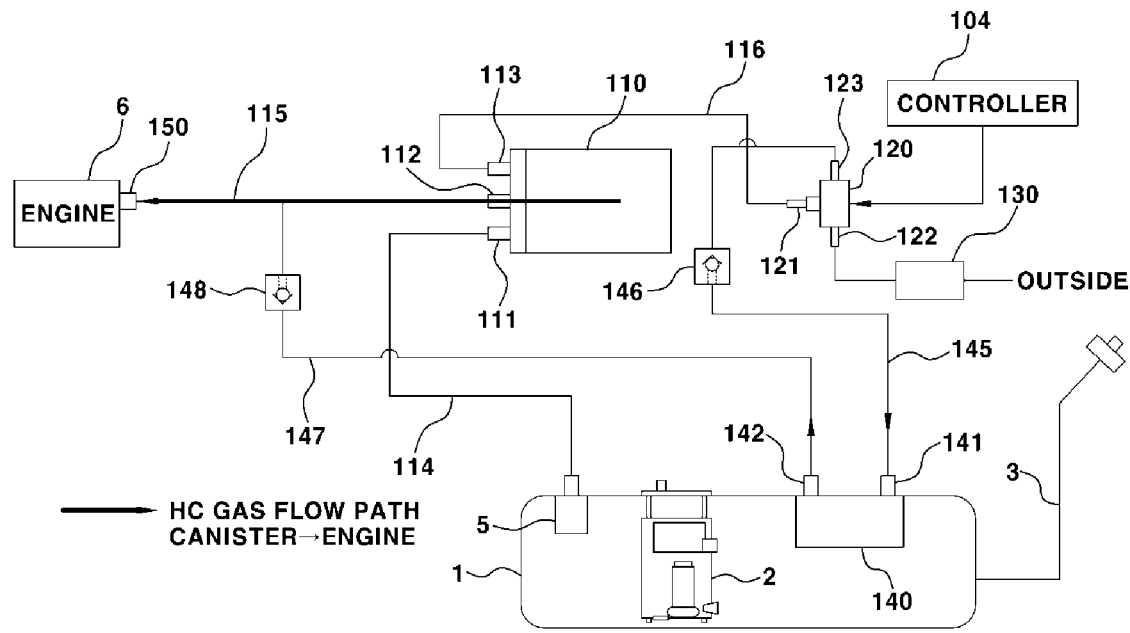
FIGS. 10 and 11 are schematic diagrams illustrating a state in which a purge operation is performed when the vehicle is in the driving state under the high-temperature and high-altitude conditions, in the fuel system according to one embodiment of the present disclosure.
Figure 11:
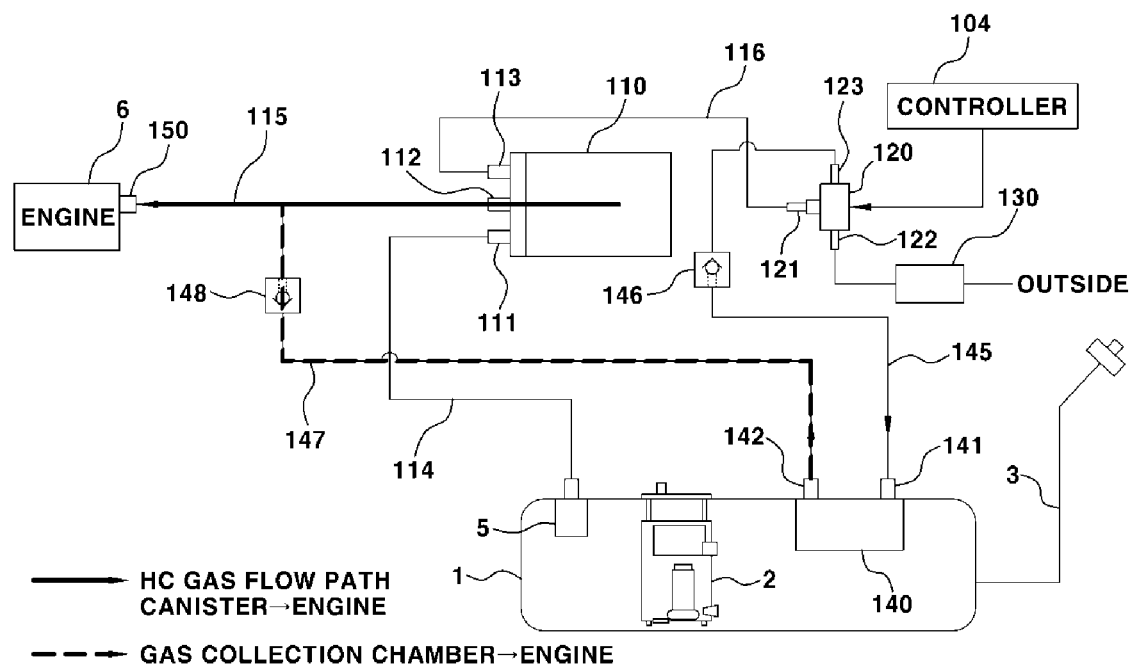

Next, FIGS. 10 and 11 illustrate the state in which the purge operation is performed when the vehicle is in the driving state under the high-temperature and high-altitude conditions, in the fuel system according to the present disclosure. Upon determining that the current environment corresponds to the high-temperature and high-altitude conditions and the vehicle is in the driving state, the controller 104 selectively performs one of a first purge mode, in which only the fuel evaporation gas collected in the canister 110 is purged, and a second purge mode, in which the fuel evaporation gas collected in the canister 110 and the fuel evaporation gas collected in the gas collection chamber 140 are purged, depending on a vehicle driving state. FIG. 10 shows the first purge mode, and the FIG. 11 shows the second purge mode.

Here, the vehicle driving state may include a vehicle load. As stated in Table 1 below, when the vehicle drives uphill or drives at a high speed under the high-temperature and high-altitude conditions, the vehicle enters a high-load state in which the vehicle load is higher than or equal to a designated level, and the engine requires to consume an increased amount of the fuel and to consume a decreased amount of the fuel evaporation gas (HO gas) (i.e., a reduced amount of the fuel evaporation gas purged).

TABLE 1

| | | Engine condition | | | | |
|---|---|---|---|---|---|---|
| Purge mode | Load condition | Driving condition | Fuel consumption | Fuel evaporation gas consumption | PCSV | Purge condition |
| 1st purge mode | High vehicle load | Uphill driving/ high-speed driving | Increase required | Decrease required (decrease in amount purged) | Decrease in duty (decrease in purge flow rate) | Purge of only canister |
| 2nd purge mode | Low vehicle load | Downhill driving/ low-speed driving/ idling | Increase not required | Increase possible (increase in amount purged) | Increase in duty (increase in purge flow rate) | Purge of both canister and gas collection chamber |

For this purpose, the controller 104 decreases the duty of the PCSV 150 and thereby decreases the flow rate of the fuel evaporation gas passing through the PCSV 150 (i.e., the purge flow rate of the PCSV 150) so as to be less than or equal to a predetermined value, and the second check valve 148 is not opened and thus only the fuel evaporation gas collected in the canister 110 is inhaled into the engine intake system. As such, in the high-load state in which the vehicle load is higher than or equal to the designated level, the first purge mode, in which only the fuel evaporation gas collected in the canister 110 is inhaled into the engine intake system so as to be combusted in the engine 6, is performed.

When the vehicle load is high and the amount of the fuel evaporation gas inhaled into the engine 6 is increased, engine output may be insufficient and thus it is required to decrease the amount of the fuel evaporation gas. Therefore, in order to decrease the amount of the fuel evaporation gas, only the fuel evaporation gas collected in the canister 110 is inhaled into the engine 6, and the fuel evaporation gas collected in the gas collection chamber 140 is prevented from being inhaled into the engine 6. In order to prevent the fuel evaporation gas collected in the gas collection chamber 140 from being inhaled into the engine 6, opening of the second check valve 148 must be avoided, and for this purpose, the flow rate of the fuel evaporation gas passing through the PCSV 150 (i.e., the purge flow rate) is reduced.

On the other hand, when the vehicle drives downhill, drives at a low speed or idles under the high-temperature and high-altitude conditions, the vehicle enters a low-load state in which the vehicle load is lower than the designated level. When the vehicle load is less than the designated level, the engine does not need to consume more fuel. However, in this case, increasing the amount of the fuel evaporation gas (HC) gas that is consumed (increasing the purge flow rate) is possible.

Therefore, when the vehicle load is lower than the designated level, the controller 104 increases the duty of the PCSV 150 and thus increases the flow rate of the fuel evaporation gas passing through the PCSV 150 (i.e., the purge flow rate) so as to exceed the predetermined value, and thereby, the second check valve 148 is opened. Therefore, the second purge mode, in which both the fuel evaporation gas collected in the canister 110 and the fuel evaporation gas collected in the gas collection chamber 140 are inhaled into the engine intake system due to the negative pressure of the engine 6 so as to be combusted in the engine 6, may be performed.

In the low-load state during driving of vehicle, not only the fuel evaporation gas collected in the canister 110 but also the fuel evaporation gas collected in the gas collection chamber 140 are inhaled into the engine intake system so as to be combusted in the engine 6, and thereby, the gas collection chamber 140 is emptied, thereby securing a space for subsequent reuse.

As described above, the opened or closed state of the second check valve 148 is controlled in connection with the flow rate of the fuel evaporation gas passing through the PCSV 150. That is, the controller 104 may increase the flow rate of the fuel evaporation gas passing through the PCSV 150 by increasing a duty value for controlling the PCSV 150 to exceed a predetermined value, thereby opening the second check valve 148. When the second check valve 180 is opened, the fuel evaporation gas collected in the gas collection chamber 140 may be inhaled into the engine 6 so as to be combusted.

In the second purge mode, when the controller 104 increases the duty of the PCSV 150 so as to exceed the predetermined value, the flow rate of the fuel evaporation gas passing through the PCSV 150 is increased, the intake pressure in the purge line 115 applied by the engine 6 is increased to a designated level or higher, and consequently, the second check valve 148 is opened and the fuel evaporation gas collected in the gas collection chamber 140 may be inhaled into the engine intake system through the gas intake line 147.

Figure 12:
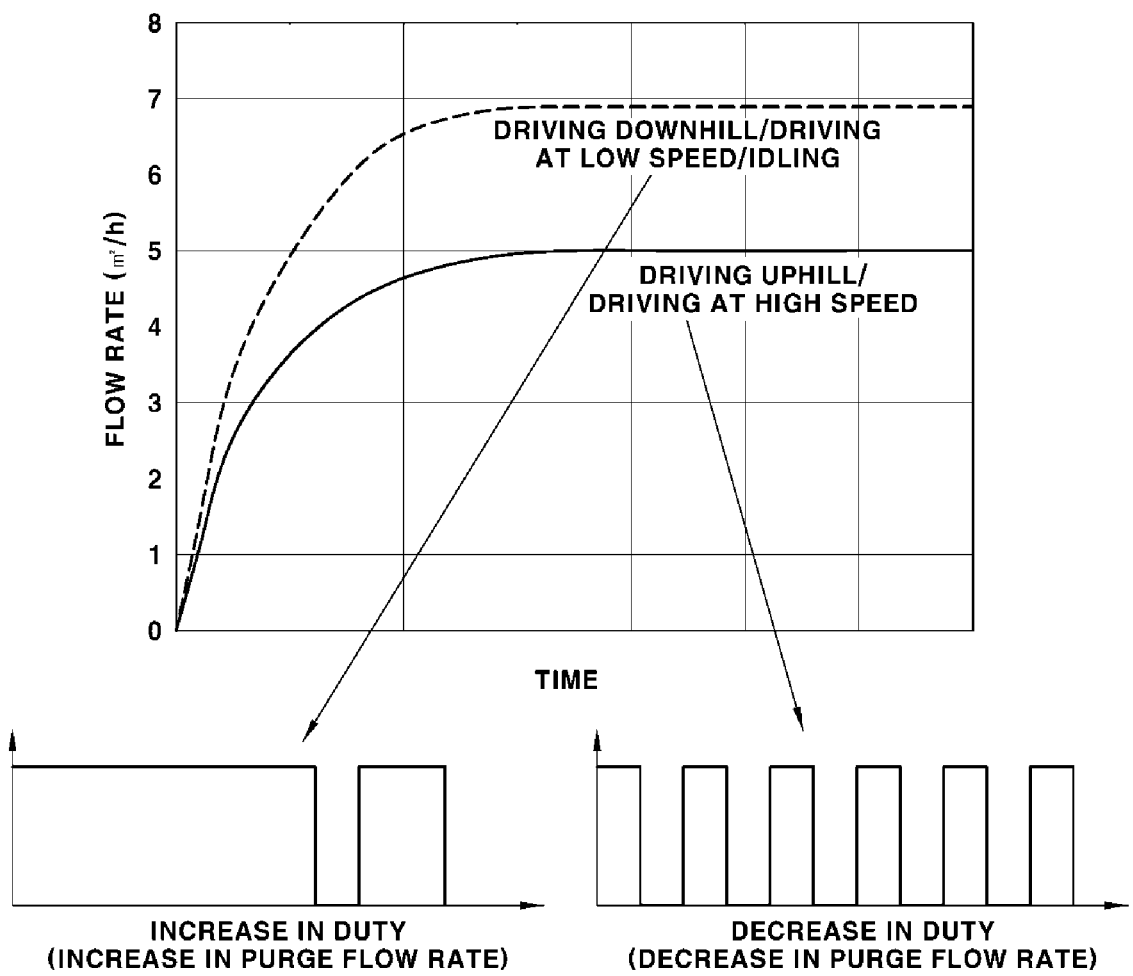
FIG. 12 is a graph exemplarily illustrating a duty control state of a PCSV depending on vehicle driving conditions according to the present disclosure.

FIG. 12 is a diagram exemplarily illustrating a duty control state of the PCSV 150 depending on vehicle driving conditions according to the present disclosure. Referring to FIG. 12, in the high-load driving condition, such as when driving uphill or driving at a high speed, the controller 104 increases the duty of the PCSV 150 so as to increase the purge flow rate, and in the low-load driving condition, such as when driving downhill, driving at a low speed or idling, the controller 104 decreases the duty of the PCSV 150 so as to decrease the purge flow rate.

Figure 13:
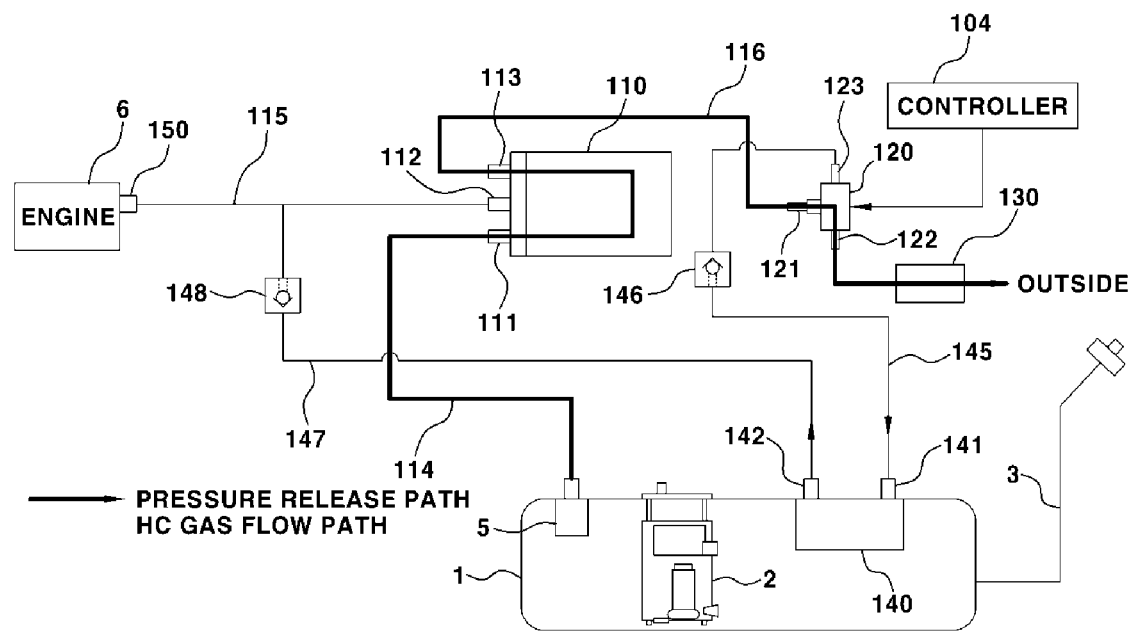
FIG. 13 is a schematic diagram illustrating a gas flow state in which pressure in a fuel tank is released under the normal conditions in the fuel system according to one embodiment of the present disclosure.

FIG. 13 is a schematic diagram illustrating a fuel evaporation gas flow state in which the pressure in the fuel tank is released when the current environment corresponds to normal conditions in the fuel system according to one embodiment of the present disclosure. Here, the normal conditions mean conditions other than the above-described high-temperature and high-altitude conditions. Upon determining based on signals from the respective sensors of the detector that the current environment corresponds to conditions other than the above-described high-temperature and high-altitude conditions (i.e., the normal conditions) and the vehicle is in the stopped state, the controller 104 outputs a control signal for opening the flow path from the canister 110 to the air filter 130 (to the atmosphere) in the closed state of the PCSV 150. Thereby, the operation of the valve body of the three-way valve 120 is controlled by the control signal from the controller 104, and thus the inner flow path between the first port 121 and the second port 122 is opened.

As such, when the flow path of the three-way valve 120 to the atmosphere (the flow path to the atmosphere line 116 connected to the air filter 130) is opened, the inside of the fuel tank 1 is in the state in which the positive or negative pressure in the fuel tank 1 is releasable. For example, the canister 110 may be connected to the atmosphere, and thereby, the fuel evaporation gas in the fuel tank 1 may be moved to the canister 110 and then be discharged to the atmosphere.

When positive pressure is released in the stopped state of the vehicle, the fuel evaporation gas in the fuel tank 1 is moved to the canister 110 along the loading line 114, a portion of the fuel evaporation gas is adsorbed onto the adsorbent substance of the canister 110 so as to be collected therein, and the remaining portion of the fuel evaporation gas sequentially passes through the three-way valve 120 and the air filter 130 and is then discharged to the atmosphere while moving along the atmosphere line 116.

When the vehicle is in the driving state under the normal conditions, the purge operation of purging the fuel evaporation gas to the engine 6 and then removing the fuel evaporation gas is performed when the pressure in the fuel tank 1 is negative. In the same manner as under the high-temperature and high-altitude conditions, the controller 104 performs control in the first purge mode (with reference to FIG. 10) or in the second purge mode (with reference to FIG. 11) depending on the vehicle driving condition.

FIG. 10 shows the flow path of the fuel evaporation gas in the first purge mode, in which only the fuel evaporation gas collected in the canister 110 is purged, and FIG. 11 shows the flow path of the fuel evaporation gas in the second purge mode, in which both the fuel evaporation gas collected in the canister 110 and the fuel evaporation gas collected in the gas collection chamber 140 are purged. Even under the normal conditions, in the same manner as under the high-temperature and high-altitude conditions, the controller 104 increases or decreases the duty of the PCSV 150 depending on the vehicle load state, and thereby enables only the fuel evaporation gas collected in the canister 110 to be inhaled into the engine 6 so as to be combusted, or enables both the fuel evaporation gas collected in the canister 110 and the fuel evaporation gas collected in the gas collection chamber 140 to be inhaled into the engine 6 so as to be combusted. The purge operation performed in the first purge mode or in the second purge mode in the negative pressure state within the fuel tank 1 during driving of the vehicle under the normal conditions is the same as the above-described purge operation performed under the high-temperature and high-altitude conditions, and a detailed description thereof will thus be omitted.

Figure 14:
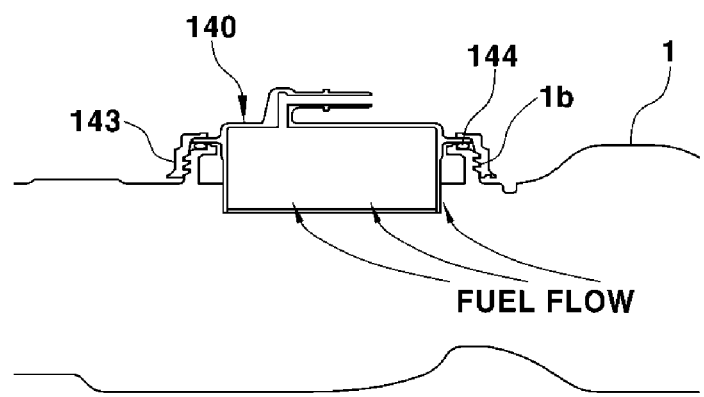
FIG. 14 is a cross-sectional view illustrating the gas collection chamber serving as a diaphragm in the fuel tank so as to reduce fuel-sloshing noise in the fuel system according to one embodiment of the present disclosure.

FIG. 14 is a cross-sectional view illustrating the gas collection chamber 140 installed in the fuel tank 1 according to the present disclosure, and shows that the gas collection chamber 140 installed in the fuel tank 1 serves as a diaphragm which reduces fuel-sloshing noise. During driving of the vehicle, when the fuel in the fuel tank 1 flows, the fuel collides with the outer surface of the gas collection chamber 140, and in this case, the gas collection chamber 140 acts as a resistor to fuel flow. The gas collection chamber 140 serves to reduce the fuel-sloshing noise while reducing fuel flow in the fuel tank 1.

Figure 15:
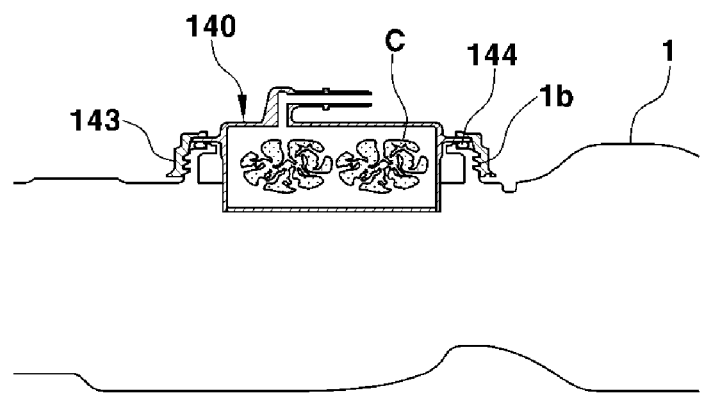
FIG. 15 is a cross-sectional view illustrating a gas collection chamber used as a subsidiary canister in a fuel system according to another embodiment of the present disclosure.
Figure 16:
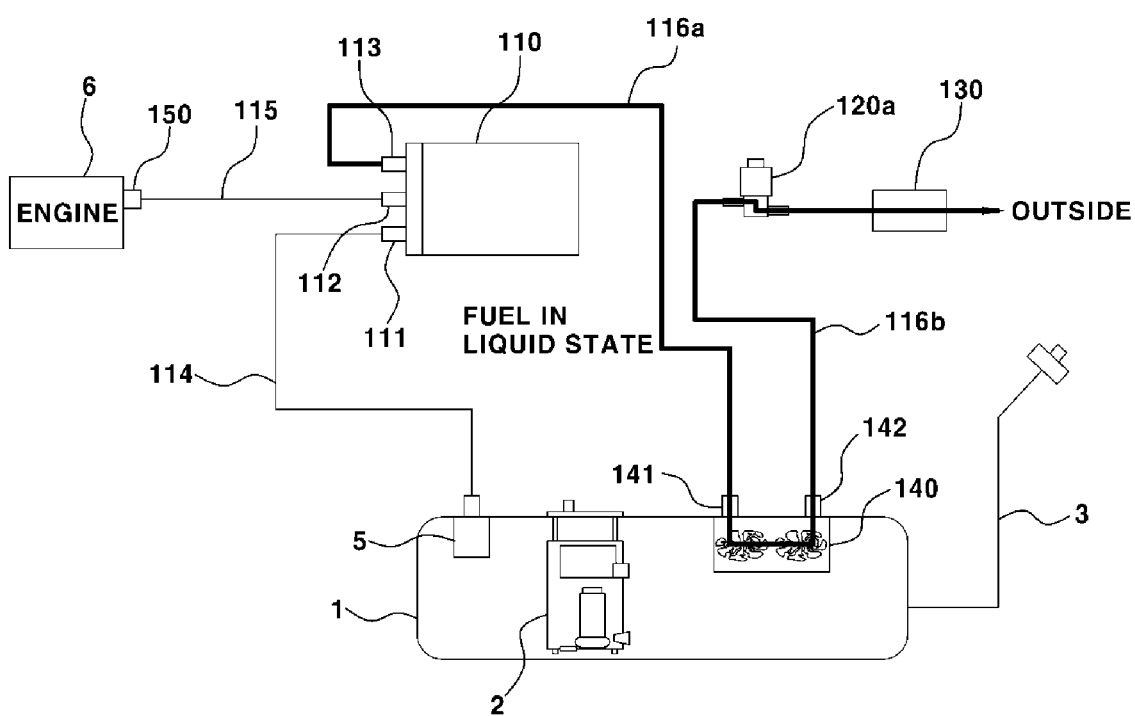
FIG. 16 is a schematic diagram illustrating the fuel system having the gas collection chamber used as the subsidiary canister according to another embodiment of the present disclosure.

FIGS. 15 and 16 illustrate a fuel evaporation gas treatment system having a gas collection chamber 140 according to another embodiment of the present disclosure. As shown in these figures, the gas collection chamber 140 may be filled with activated carbon C which is an adsorbent substance, and the gas collection chamber 140 filled with the activated carbon C may be used as a subsidiary canister. Here, a canister 110 may be used as a main canister. The gas collection chamber 140 filled with the activated carbon C is installed to be located within a fuel tank 1 in the same manner as the former embodiment. However, as shown in these figures, remaining elements of the fuel evaporation gas treatment system according to this embodiment other than the gas collection chamber 140 are the same as those of the conventional fuel evaporation gas treatment system.

In the embodiment of FIG. 16, an atmosphere port 113 of the main canister 110 is connected to an inlet 141 of the gas collection chamber 140 serving as the subsidiary canister by a gas discharge line 116a. Further, an atmosphere line 116 is connected to an outlet 142 of the gas collection chamber 140, and a CCV 120a and an air filter 130 are installed on the atmosphere line 116.

In this configuration, the gas collection chamber 140 serving as the subsidiary canister is additionally installed on the atmosphere line 116 connected to the atmosphere port 113 of the canister 110 in the conventional fuel evaporation gas treatment system. In the embodiment of FIG. 16, a portion of the fuel evaporation gas is adsorbed onto the activated carbon C in the main canister 110, and the remainder of the fuel evaporation gas, which is not adsorbed onto the activated carbon C in the main canister 110, is discharged from the atmosphere port 113 of the main canister 110, is moved to the gas collection chamber 140 serving as the subsidiary canister along the gas discharge line 116a, and is adsorbed onto the activated carbon C in the gas collection chamber 140.

Figure 17:
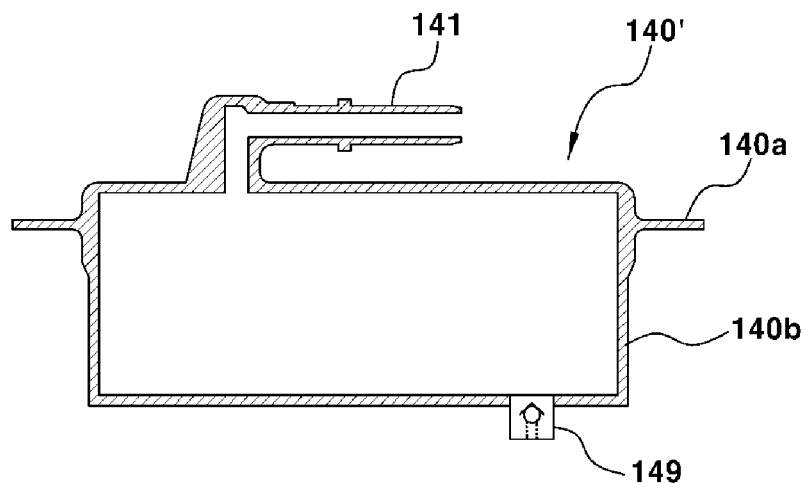
FIG. 17 is a cross-sectional view illustrating a separator configured to store fuel in a liquid state having passed through a valve of a fuel tank according to yet another embodiment of the present disclosure.
Figure 18:
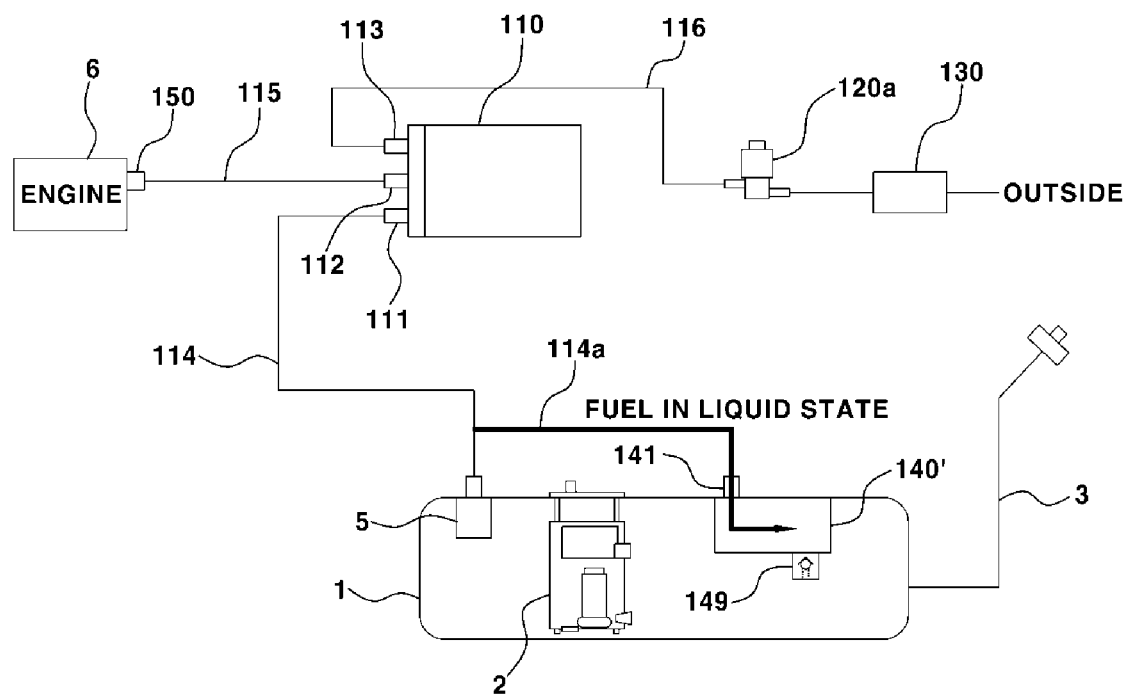
FIG. 18 is a schematic diagram of a fuel system including the separator of FIG. 17.

FIGS. 17 and 18 illustrate a fuel evaporation gas treatment system having a separator 140' according to yet another embodiment of the present disclosure, and the separator 140' may have the same shape as the above-described gas collection chamber 140. Further, the structure and the method for assembling the separator 140' with a fuel tank 1 are the same as those for assembling the gas collection chamber 140 with the fuel tank 1. However, no outlet 142 is formed in the separator 140'.

A separate check valve 149 is installed at a chamber part 140b provided under a flange part 140a of the separator 140' inserted into the fuel tank 1. Further, a branch line, which branches off from a loading line 114 configured to connect a rollover valve 5 of the fuel tank 1 to a loading port 111 of the canister 110, is connected to an inlet 141 of the separator 140'.

The canister 110, a CCV 120a, an air filter 130, a PCSV 150, the loading line 114, a purge line 115, an atmosphere line 116, etc. of the fuel evaporation gas treatment system according to this embodiment are the same as those of the conventional fuel evaporation gas treatment system, except that the separator 140' is installed and the branch line 114a branching off from the loading line 114 is connected to the inlet 141 of the separator 140'.

In the conventional fuel evaporation gas treatment system, if the fuel in a liquid state in the fuel tank 1 passes through the rollover valve 5 and is then introduced into the canister 110, the fuel is deposited in the canister 110 and thus engine 6 may stall.

On the other hand, in the embodiment shown in FIG. 18, the fuel in a liquid state having passed through the rollover valve 5 does not flow towards the canister 110, but is moved towards the separator 140a' along the branch line 114a and then stored in the separator 140'. The fuel stored in the separator 140' is discharged to the inside of the fuel tank 1 through the check valve 149.

Consequently, in the embodiment shown in FIG. 18, the separator 140' serves as a fuel separator which separates the fuel in the liquid state having passed through the rollover valve 5 from the fuel evaporation gas moved to the canister 110 through the loading line 114, collects the fuel, and then returns the fuel into the fuel tank 1.

As is apparent from the above description, a fuel system for vehicles according to the present disclosure has a gas collection chamber separately provided to collect fuel evaporation gas discharged from a canister, and thus enables the fuel evaporation gas discharged from the canister to be stored in the gas collection chamber when the vehicle is in the stopped state under the high-temperature and high-altitude conditions and then enables the fuel evaporation gas stored in the gas collection chamber to be transferred to an engine so as to be combusted when the vehicle is in the driving state, thereby being capable of solving a several problem in which the fuel evaporation gas is discharged from the canister to the outside through an atmosphere line when the vehicle is in the stopped state under the high-temperature and high-altitude conditions, and thereby, a driver or passengers may detect the smell of fuel.

The disclosure has been described in detail with reference to exemplary embodiments thereof. However, it will be appreciated by those skilled in the art that changes may be made in these embodiments without departing from the principles and spirit of the disclosure, the scope of which is defined in the appended claims and their equivalents.

What is claimed is:

1. A fuel system for a vehicle, the fuel system comprising a fuel evaporation gas treatment system configured to control fuel evaporation gas generated inside a fuel tank, wherein the fuel evaporation gas treatment system comprises:
    a canister configured to allow the fuel evaporation gas flowing into the canister from the fuel tank through a loading line to be adsorbed onto an adsorbent substance so as to be collected in the canister, the canister configured such that the fuel evaporation gas adsorbed onto the adsorbent substance flows into an engine through a purge line connecting the canister to the engine;
    a purge control solenoid valve disposed in a fuel evaporation gas intake path between the canister and the engine; and
    a gas collection chamber configured to store the fuel evaporation gas discharged from the canister through an atmosphere line connected to the canister,
    wherein an outlet of the gas collection chamber is connected to the purge line through a gas intake line so that the fuel evaporation gas stored in the gas collection chamber flows to the engine through the gas intake line and the purge line.

2. The fuel system of claim 1, wherein a three-way valve is disposed on the atmosphere line which is configured to connect the canister to an air filter, and
    wherein a gas discharge line configured to branch off from the atmosphere line through the three-way valve is connected to an inlet of the gas collection chamber.

3. The fuel system of claim 2, wherein the gas intake line connects the outlet of the gas collection chamber to the purge line between the canister and the purge control solenoid valve.

4. The fuel system of claim 3, wherein a first check valve configured to allow the fuel evaporation gas having passed the three-way valve to flow in a direction towards the gas collection chamber and to block flow of the fuel evaporation gas in an opposite direction is disposed on the gas discharge line, and
    wherein a second check valve configured to allow the fuel evaporation gas discharged from the gas collection chamber to flow in a direction towards the purge line and the engine and to block flow of the fuel evaporation gas in an opposite direction is disposed on the gas intake line.

5. The fuel system of claim 2, wherein the three-way valve comprises:
    a first port connected to an atmosphere port of the canister through the atmosphere line;
    a second port connected to the air filter through the atmosphere line; and a third port connected to the gas discharge line, and wherein the three-way valve is configured to selectively open one of an inner flow path between the first port and the second port and an inner flow path between the first port and the third port.

6. The fuel system of claim 2, further comprising:

a detector configured to detect environmental information of a place, in which the vehicle is located, and vehicle state information; and a controller configured to control an opening and closing operation of the three-way valve based on the environmental information and the vehicle state information detected by the detector.

7. The fuel system of claim 6, wherein, upon determining based on the environmental information detected by the detector that a current environment corresponds to high-temperature and high-altitude conditions satisfying predetermined conditions and upon determining based on the vehicle state information detected by the detector that the vehicle is in a stopped state, the controller controls the operation of the three-way valve to block an inner flow path thereof towards the air filter and to open an inner flow path thereof towards the gas collection chamber so that the fuel evaporation gas discharged from the canister flows to the gas collection chamber alone.

8. The fuel system of claim 7, wherein, upon determining based on the environmental information detected by the detector that the current environment does not correspond to the high-temperature and high-altitude conditions, the controller controls the operation of the three-way valve to block the inner flow path thereof towards the gas collection chamber and to open the inner flow path thereof towards the air filter so that the fuel evaporation gas discharged from the canister flows to the air filter.

9. The fuel system of claim 7, wherein the detector comprises:

an outdoor temperature sensor configured to detect an outdoor temperature; and a vehicle speed sensor configured to determine whether or not the vehicle is in the stopped state, and wherein the predetermined conditions are set to be either a condition in which the outdoor temperature detected by the outdoor temperature sensor is higher than or equal to a predetermined temperature or a condition of sharp temperature rise in which a slope of a rise of the outdoor temperature detected by the outdoor temperature sensor is greater than or equal to a predetermined value.

10. The fuel system of claim 7, wherein the detector comprises:

a fuel pressure sensor configured to detect an inner temperature of the fuel tank; and a vehicle speed sensor configured to determine whether or not the vehicle is in the stopped state;

wherein the controller determines an inner temperature of the fuel tank corresponding to the inner pressure of the fuel tank detected by the fuel pressure sensor based on the inner pressure of the fuel tank using set information, and wherein the predetermined conditions are set to be either a condition in which the determined inner temperature of the fuel tank is higher than or equal to a predetermined temperature or a condition of sharp temperature rise in which a slope of a rise of the determined inner temperature of the fuel tank is greater than or equal to a predetermined value.

11. The fuel system of claim 6, wherein the gas intake line is configured to connect the outlet of the gas collection tank to the purge line between the canister and the purge control solenoid valve, wherein a check valve configured to allow the fuel evaporation gas discharged from the gas collection chamber to flow in a direction towards the purge line and the engine and to block flow of the fuel evaporation gas in an opposite direction is disposed on the gas intake line, and wherein, upon determining based on the detected vehicle state information that the vehicle is in a driving state, the controller controls a flow rate of the fuel evaporation gas passing through the purge control solenoid valve depending on vehicle driving state information so as to selectively open the check valve.

12. The fuel system of claim 11, wherein the vehicle driving state information comprises a vehicle load, and wherein, in a high-load state in which the vehicle load is higher than or equal to a designated level, the controller decreases the flow rate of the fuel evaporation gas passing through the purge control solenoid valve to be less than or equal to a predetermined value so that only the fuel evaporation gas collected in the canister is inhaled into the engine and purged in a closed state of the check valve.

13. The fuel system of claim 11, wherein the vehicle driving state information comprises a vehicle load, and wherein, in a low-load state in which the vehicle load is lower than a designated level, the controller increases the flow rate of the fuel evaporation gas passing through the purge control solenoid valve to exceed a predetermined value so that both the fuel evaporation gas collected in the canister and the fuel evaporation gas collected in the gas collection chamber are inhaled into the engine and purged in an opened state of the check valve.

14. The fuel system of claim 1, wherein the gas collection chamber is disposed in the fuel tank.

15. The fuel system of claim 14, wherein the gas collection chamber is arranged such that at least a portion thereof is configured to be disposed in the fuel tank.

16. The fuel system of claim 15, wherein a mounting hole is defined in the fuel tank, wherein a flange part protruding from an entire circumference of an upper end of the gas collection chamber is defined at the upper end of the gas collection chamber, and wherein, in a state in which a chamber part of the gas collection chamber disposed under the flange part is disposed in the fuel tank through the mounting hole, the gas collection chamber is configured to be fixed to the fuel tank by a mounting cap.

17. The fuel system of claim 16, wherein a cylindrical fastening part protruding in an outward direction of the fuel tank extends along an edge of the mounting hole of the fuel tank, and wherein in a state in which the flange part of the gas collection chamber is disposed on the upper surface of the fastening part, the mounting cap is fastened to the fastening part by threaded engagement so as to surround the flange part of the gas collection chamber from above.

* * * * *